E. F. HARTSHORN.
CLIP FOR SECURING SHADES TO ROLLERS.
APPLICATION FILED JULY 1, 1912.
1,059,990.
Patented Apr. 29, 1913.
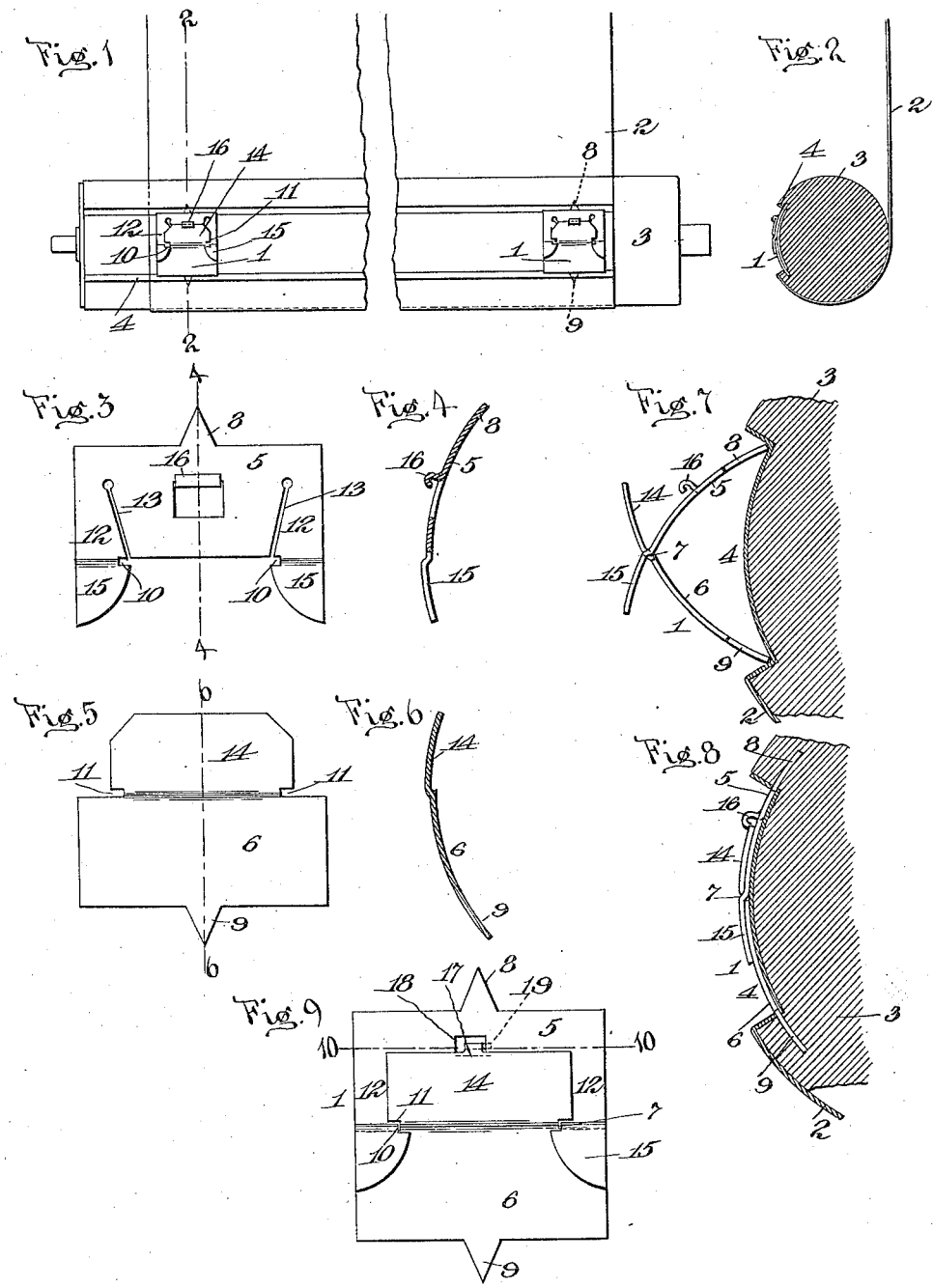
Witnesses:
John L. Roach
Gustav A. Schellack
Inventor
Edmund F. Hartshorn
By Dyer Dyer & Taylor
Attorneys.

UNITED STATES PATENT OFFICE.

EDMUND F. HARTSHORN, OF NEWARK, NEW JERSEY, ASSIGNOR TO STEWART HARTSHORN COMPANY, OF EAST NEWARK, NEW JERSEY, A CORPORATION OF NEW JERSEY.

CLIP FOR SECURING SHADES TO ROLLERS.

1,059,990.  Specification of Letters Patent.  Patented Apr. 29, 1913.

Application filed July 1, 1912. Serial No. 706,878.

*To all whom it may concern:*

Be it known that I, EDMUND F. HARTSHORN, a citizen of the United States, residing in Newark, county of Essex, and State of New Jersey, have invented a certain new and useful Clip for Securing Shades to Rollers.

This invention relates to improvements in clips for attaching shades to rollers.

The objects I have in view are to produce a clip which may be used for attaching the shade to a wooden roller, without the use of tools.

A further object is to produce a clip which may be applied by an unskilled person.

A still further object is to produce a clip which will firmly hold the shade in position upon the roller, without tearing the latter.

Another object is to produce a clip which, when in place, will not project beyond the face of the roller, so that the shade may be evenly wound upon the same.

These and further objects will more fully appear from the following specification and accompanying drawings, considered together or separately.

In the drawings, Figure 1 is an elevation of a shade roller, and two clips thereon, embodying my invention. Fig. 2 is a section on the line 2—2 of Fig. 1. Fig. 3 is an elevation, on an enlarged scale, of one of the members of which the clip, made according to the preferred embodiment of the invention, is formed. Fig. 4 is a section on the line 4—4 of Fig. 3. Fig. 5 is an elevation of the second member of the clip, to be combined with the member shown in Fig. 3. Fig. 6 is a sectional view on the line 6—6 of Fig. 5. Fig. 7 is a side view of the clip shown in Fig. 1, only on an enlarged scale, also showing the shade and roller in section, the clip being in the position that it assumes when it is being applied to the roller. Fig. 8 is a similar view, showing the clip in final position. Fig. 9 is an elevation of a modification of the invention. Fig. 10 is a section on the line 10—10 of Fig. 9.

In all of the views, like parts are designated by the same reference characters.

Referring to Fig. 1, the clips 1, 1, fasten the shade 2, to the roller 3. I prefer to make the roller of wood. I prefer also to provide it with a longitudinal groove 4.

Each clip comprises a member 5, which coöperates with and is pivotally connected to a member 6. The two members are secured together by the pivotal connection 7. The member 5 is provided with a prong 8, or other device, for penetrating the roller. The member 6 is provided with a similar prong or device 9. Only one prong is shown on each member, but it is to be understood that the number of prongs and their shape may be modified, as desired.

I prefer to make the pivotal connection between the two members as follows: The member 5 is provided with notches 10. The member 6 is provided with notches 11. The two members are assembled so that the notches 10 enter the notches 11. In order to allow the parts to be assembled, I prefer to make the notches 10 in elastic arms 12. These arms are conveniently made by means of the diagonal cuts 13. By means of this structure, the arms may be separated a sufficient extent to allow the notches 10 to enter the notches 11. The notches 11 are formed in an offset flap 14. This flap constitutes an overlapping portion. I prefer to have the elastic arms 12 carry overlapping wings 15. These wings, however, are not essential. The wings, when employed, are offset, as shown. In the preferred embodiment of the invention the member 5 is provided with a catch 16. This catch is adapted to engage with the offset flap 14.

The device is preferably made of elastic material, such as tempered steel, and may be finished in any manner.

The preferred embodiment of the invention is applied to the roller and shade as follows: The end of the shade is placed within the groove 4, as shown in Fig. 7. The two members of the clip are opened, as shown in that figure. The prongs 8 and 9 are then forced into opposite corners of the groove. They penetrate the shade. As the prongs are forced into the roller, the two members of the clip turn upon the pivotal connection 7, until the prongs are entirely seated and assume the position shown in Fig. 8. The catch 16 will then engage with the offset flap 14. I prefer to make the length of the completed clip, except the prongs, about the same dimensions as the width of the groove. When so made, the squared edges of the clip will seat into the corners of the groove and assist in holding the shade in place. I prefer to make the groove 4 sufficiently deep so that when the clip is in position, as shown in Fig. 8, it will be entirely seated in the groove. The shade may be wrapped around the roller without coming in contact with the clip. While I have shown the prongs 8 and 9 as both passing through the shade, this is not essential. The shade may be seated in the groove, its free edge entering one of the corners thereof. The clip will then be inserted in place,—one of the prongs 8 or 9 passing through the shade and entering the corner of the groove. The other prong will enter the corner of the groove at the edge of the shade. This arrangement has the advantage of being easier to apply than that illustrated, as the edge of the shade may be alined with the corner of the groove. It is to be understood that as many clips are applied as are necessary to hold the shade in position.

I prefer to use the clip in connection with a roller having a longitudinal groove. But it is to be understood that a roller without a groove may be employed, provided the prongs are so shaped that they will enter the roller. The longitudinal groove 4 may be continuous from end to end of the roller, as shown; but this is not essential, as the same ends will be secured by making the groove in the form of a line of pockets of the proper shape and size. The offset overlapping wings 15 are useful in forming a device for engagement by the finger of the operator, assisting to adjust the clip while it is being inserted in place. But these wings are not essential, and may be omitted. I prefer to make the catch in the manner best shown in Fig. 4, so that it engages with the edge of the offset flap 14. But such arrangement is not essential. In Fig. 9, the catch 17 is formed upon the flap 14. This catch passes through an opening 18, in the member 5, and engages with the lip 19. This catch, instead of engaging with the edge of the member, engages with the side. There is sufficient elasticity in the material of which the clip is made, to allow the catch to spring past the lip and lock the parts in position. I prefer to make the device with the catch as shown, but the catch may be omitted if desired.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

1. The combination with a shade roller having a shallow longitudinal groove, of a shade, and a clip, said clip being formed of two members pivotally connected together, each member having a device which enters the sides of the groove.

2. A clip for fastening shades to rollers, which comprises two members pivotally connected together, each member having a device which enters the roller.

3. A clip for fastening shades to rollers, which comprises two members pivotally engaging together, a portion of one member overlapping the other, and a device on each member, which penetrates the roller.

4. A clip for securing a shade to a roller, which comprises two members, a pivotal connection between the members, a portion of one member overlapping the other, and a catch engaging the overlapping portion of one member with the overlapped portion of the other member.

5. A clip having a member, elastic arms thereon, notches in the arms, in combination with a second member having an offset flap or overlapping portion, and notches therein which engage with the notches of the other member.

6. A clip having a member, elastic arms thereon, notches in the arms, in combination with a second member having an offset flap or overlapping portion and notches therein which engage with the notches of the other member, the first named member having offset, overlapping wings.

This specification signed and witnessed this 20th day of June, 1912.

EDMUND F. HARTSHORN.

Witnesses:
E. DURGIN,
ALEX. C. ADAMS.

---

Copies of this patent may be obtained for five cents each, by addressing the "Commissioner of Patents, Washington, D. C."